Patented Oct. 29, 1929

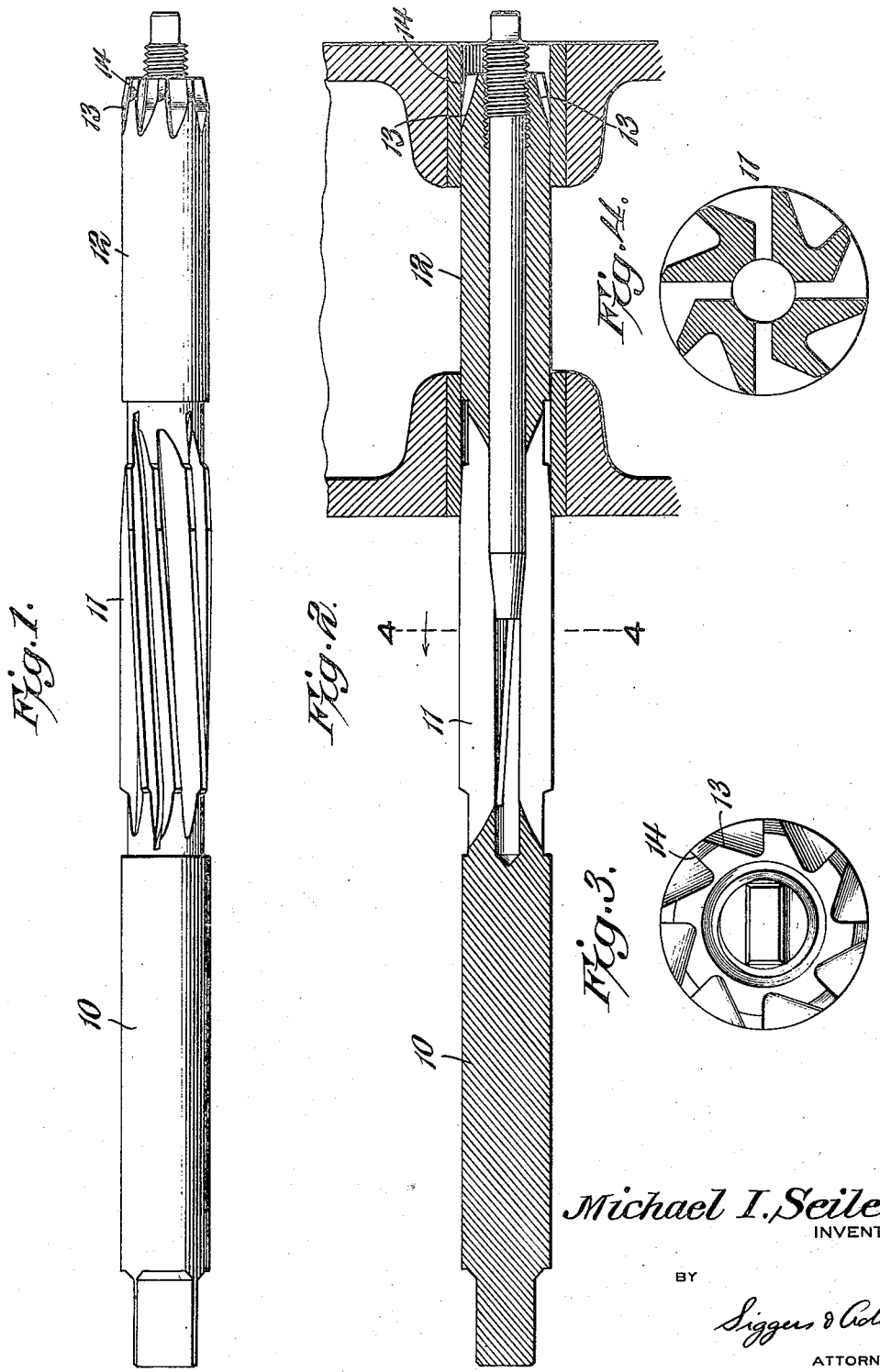

1,733,827

UNITED STATES PATENT OFFICE

MICHAEL I. SEILER, OF MILLERSBURG, PENNSYLVANIA, ASSIGNOR TO KEYSTONE REAMER & TOOL CO., OF MILLERSBURG, PENNSYLVANIA, A CORPORATION OF PENNSYLVANIA

REAMER

Application filed August 30, 1927. Serial No. 216,462.

This invention relates to reamers and aims to provide an improved long pilot reamer eminently adapted for use as a hand tool to ream out perfectly alined spaced apart holes.

This application involves an improvement over the invention disclosed in my copending application, Serial No. 566,791, filed June 8, 1922.

In the accompanying drawings:

Fig. 1 is a side elevational view of a reamer embodying the improvements;

Fig. 2 is a longitudinal sectional view of the reamer shown in Fig. 1;

Fig. 3 is a front end view of the reamer shown in Fig. 1; and

Fig. 4 is a cross sectional view taken on the line 4—4 of Fig. 2.

It is exceedingly important, in many instances, that reamed-out, spaced-apart holes shall be exactly alined. This is particularly true in the automotive industry wherein long pilot reamers for such work find their principal use.

For some purposes especially where such reamers are used as hand or floating tools, for example, in reaming out piston pin bushings or bearings it is necessary that the front pilot of the reamer be long enough to reach through the first hole and part way through the second hole before the reaming begins in order to lead true during the reaming operation. Moreover, in such instances, the front end of the pilot often encounters burrs or other obstacles in the bearings or in the edges of the holes and it is important that it shall have provision for removing such obstacles, thereby permitting the pilot to enter freely without danger of misalinement of the holes. The present invention aims particularly to provide such a reamer that is adapted to accomplish the above named purposes.

Referring particularly to the drawing, there is shown a reamer having a shank portion 10 of a diameter slightly less than that of the finished hole which the tool is adapted to ream, this shank being ground within close limits to act as a rear pilot. Below the shank portion is an elongated fluted portion 11 having cutting edges which may be either straight or spiral as desired. Herein, the fluted portion is shown as being slotted longitudinally along the bottoms of pairs of diametrically opposed flutes so that the fluted part may be expanded by the usual expanding means which will not be specifically described.

At the forward end of the reamer there is shown an elongated pilot portion 12 of such length as to span the distance between any two alined holes which the tool is intended to ream. That is to say, the length is such as will enable the reamer to be used for a definite group of standard parts of different diameters or dimensions, the maximum of which comes within the range of the pilot. Herein, the pilot is shown as being cylindrical and is of slightly less diameter than that of the holes which are to be reamed.

To enable the pilot portion to remove any burrs or like obstacles which it may encounter upon entering a hole, it is shown as having a fluted forward end 13 and forwardly and inwardly tapered side cutting edges 14 provided by relieveing and tapering the lands as clearly indicated in Fig. 1. The taper of the side cutting edges is great enough to insure that the extreme forward end of the pilot will freely enter a rather badly burred, scarred or uneven hole, but is not great enough to produce what is known in the trade as a rose end cutter. It has been found by experience that rose end cutters on pilots of this character tend to lead the pilot out of alinement with the original axis of the holes being reamed; whereas a slightly tapered end having side cutting edges only will automatically center itself in a hole while it is removing any burrs or like obstacles that may have been formed in it.

In using the reamer to ream out piston pin bushings or bearings for example, (see Fig. 2 of the drawing), the front pilot is inserted in them and turned until both holes have been fully reamed. It will be noted that the front end of the pilot must enter the second hole and be guided thereby while the cutting edges of the reamer proper first engages and cut the first hole. After the first hole has been reamed and the reamer proper enters the second hole, the shank portion 10 or rear pilot which is of slightly less diameter than the reamed first hole, will enter it and thereby guide the reamer true into and through the second hole. Thus, the reamer leads true through both holes during the entire reaming operation so that, when the operation is completed, both holes are necessarily in perfect alinement and coaxial with the original holes.

Obviously the present invention is not restricted to the particular embodiment thereof herein shown and described. Moreover, it is not indispensable that all the features of the invention be used conjointly since they may be employed advantageously in various combinations and subcombinations.

What is claimed is:

1. An expansible reamer for piston pin bearings, bushings and the like comprising a long rear shank constituting a rear pilot; a fluted and expansible intermediate blade section integral with the said shank; and a long cylindrical front pilot integral with the blade section and of slightly less diameter than the shank, said pilot having circumferentially spaced longitudinal flutes near the forward end presenting substantially radial faces and the lands between said flutes being forwardly and inwardly tapered at a small inclination and relieved so as to present side cutting edges only in order to remove any burrs at the entering ends of the holes to be reamed and accurately center the front pilot therein as the work progresses.

2. An expansible reamer of the character described comprising, in combination, a shank constituting a rear pilot; an expansible blade section; an elongated cylindrical front pilot of such length as to span the distance between spaced apart openings to be reamed; and slightly forwardly tapered side-cutting teeth only terminating at the front end of the front pilot arranged automatically to lead said pilot true or center it in an opening at the end as well as to cut away any burrs around said opening.

In testimony, that I claim the foregoing as my own, I have hereto affixed my signature.

MICHAEL I. SEILER.